INVENTOR:
E. GORDON FOSTER

INVENTOR:
E. GORDON FOSTER

Oct. 6, 1970  E. G. FOSTER  3,532,472
APPARATUS FOR CARRYING OUT PARTIAL OXIDATION OF ORGANIC COMPOUNDS
Original Filed Feb. 20, 1967  3 Sheets-Sheet 3

INVENTOR:
E. GORDON FOSTER

United States Patent Office 3,532,472
Patented Oct. 6, 1970

3,532,472
APPARATUS FOR CARRYING OUT PARTIAL
OXIDATION OF ORGANIC COMPOUNDS
E. Gordon Foster, Bronxville, N.Y., assignor to Shell
Oil Company, New York, N.Y.
Application Feb. 20, 1967, Ser. No. 619,887, which is a
continuation-in-part of abandoned application Ser. No.
262,608, Mar. 4, 1963. Divided and this application
Mar. 20, 1967, Ser. No. 626,914
Int. Cl. B01j 9/02, 9/04
U.S. Cl. 23—288                                    1 Claim

ABSTRACT OF THE DISCLOSURE

A reactor for effecting partial oxidation of organic compounds in the vapor phase comprising a reactor containing long multi-tubes having a ratio of length to diameter of above 200 packed with inert or catalytic packing and having at the inlet of the tubing separate means for introducing the material to be oxidized and the oxidizing reagent and a confluence zone in the tubes wherein the reactants are mixed as they flow through the reaction tubes.

---

This application is a division of copending patent application Ser. No. 619,887, filed February 20, 1967, which is a continuation-in-part of copending patent application Ser. No. 262,608, filed Mar. 4, 1963 and which has been abandoned.

The invention relates to an improved apparatus for carrying out a method of partially oxidizing organic compounds in the vapor phase in a specific tubular reactor in the presence of an inert packing material which can support or be impregnated with a catalytic reagent and to a reactor for carrying out such reactions.

Existing methods and equipment for partial oxidation of organic compounds involve the mixing of streams of the organic compound-containing gas and the oxygen-containing gas prior to the inlet to the catalyst-filled reaction chamber, and the flow of the resulting mixture through the catalyst bed. These techniques have the limitation that only low concentrations of either the oxygen or the organic compound reactant can be used, due to the danger of explosion, and due to the difficulty in controlling the catalyst temperature in such a way that the reaction does not "run away." These difficulties are well known in the art. The result is that either the oxygen concentration or the concentration of organic compound must be limited to relatively low concentrations. The net result is that the concentration of the desired oxygenated product in the gas leaving the reactor is low. As a further result, the reactors are large, expensive compressors are required to compress and circulate the large amounts of gas required, and expensive recovery equipment is required to recover the product from the dilute gas.

Thus, for example, in the oxidation of benzene to maleic anhydride, as practiced commercially, it is necessary to limit the concentration of benzene in the vapor feed to about 2% by volume, and the concentration of maleic anhydride in the product gas is only about 1.5% by volume. Thus, 67 volumes of gas must be compressed, circulated and processed to recover 1 volume of maleic anhydride vapor.

It is the object of the invention to provide an improved method and apparatus for effecting vapor-phase partial oxidation of organic compounds wherein the explosive limitation is avoided and the reaction can be effected at higher oxygen concentrations.

A further object is to reduce the control sensitivity problems of existing methods and reactors when operated at high concentrations of oxygen and an organic compound.

According to the present invention partial oxidation of organic compounds in the vapor phase is accomplished by directing gaseous streams of an organic compound an an oxygen-containing gas separately and in mutual isolation to a confluence zone within a long reactor tube having a ratio of length to diameter of above 200 and in excess of about 20 feet to form a mixture of substantially explosive composition, and the resulting mixture is flowed downstream from said confluence zone through a zone in the tubing which may contain a catalytic bed, at least the initial flow rate being in excess of that at which a flame within the packing can flash back, and the reaction rate is controlled by temperature to produce at the downstream end of the reactor a reacted mixture which is not explosive. The confluence zone may be empty, or may be filled with an inert packing or catalyst. It is preferably filled, however, with an inert packing and the lower portion of the reactor tubing being filled with a catalyst bed. The temperature is controlled by circulating a coolant, either a liquid or a vapor but preferably a liquid, on the outside of the reactor tube.

By a "mixture of explosive composition" is meant a gas which, when sampled and tested in a bomb equipped with a hot-wire or spark igniter, is found to be explosive. It will not be necessarily explosive under conditions existing in the packed reactor tube. In fact, one of the advantages found for the invention is that when the mixing is carried out at relatively high velocities in the reactor tube, the explosive limits, particularly, the organic compound-rich limits, are modified so as to permit high oxygen levels before the mixture can be ignited. This effect is further assisted by the presence of packing and by the cooling of the tubes.

Although the invention is particularly useful for handling mixtures of organic compound-containing streams and oxygen-containing streams which are of explosive composition, it is also useful for handling mixtures which are so near the explosive limit that they could not otherwise be handled safely because of the possibility of small fluctuations in flow rates and other upsets causing the mixture to become temporarily explosive. Both these and truly explosive compositions are herein referred to as "substantially explosive."

The specified minimum velocity is maintained within the confluence zone and at least within the initial part of the catalyst packing if used downstream thereof, say at a section two tube diameters downstream from the confluence zone. When the mixture is truly explosive under the conditions existing within the packed tube this is the flame propagation velocity; however, there is no clearly definable flame propagation velocity when explosive conditions do not prevail within the packing.

In most applications many separate reactor tubes are provided and each tube then has separate inlets to receive said streams as substreams from separate manifold means. In one embodiment the reactor tubes are mounted between vertically spaced tube sheets within a confining vessel, the space beyond one tube sheet forming an inlet manifold chamber for one feed stream which chamber is in communication with the inlet ends of the several tubes, and the space beyond the other sheet forming a discharge manifold chamber; the other feed stream is admitted as substreams to the several tubes by small pipes which extend into the open inlet ends of the tubes wherein initial packings may optionally be provided, said tubes being connected to a manifold pipe which may be situated within said inlet manifold chamber. The coolant is circulated through the space between the tube sheets. Either the organic compound-containing stream or the oxygen-containing stream may be admitted through the small pipes; however, the smaller of the two streams is preferably admitted through the small pipes.

In another embodiment of the multi-tube reactor the second stream is admitted to the confluence zones within the tubes through ports in the tube walls from a second manifold chamber. Either the organic compound-containing stream or the oxygen-containing stream may be admitted through the ports. However, the smaller of the two streams is preferably admitted through the ports.

By "long tubes" is meant tubes having lengths in excess of about 20 feet, and preferably in excess of 30 feet. Further, it is preferred to use tubes of small cross-sectional area, for attaining more effecting control of temperature. Thus, the tubes, when circular in cross section, advantageously have ratios of lengths to diameters of about 200, and ratios up to 1000 may be used.

In some cases it may be advantageous, after the initial oxidation step, to introduce additional oxygen-containing or organic compound-containing gas and mix this stream with the product gas from the first reaction gas and further oxidize the product in a second reaction step. For example, propylene may be oxidized with air in a tubular reactor, following the teaching of the invention. The product gas from this oxidation step contains acrolein. The latter organic compound-containing stream may now be further mixed with additional air in a second tubular reactor (in series with the first reactor) by the procedure of the invention and the acrolein then further oxidized with a different catalyst to acrylic acid.

According to another feature of the invention the reaction rate is controlled by measuring a property in the effluent stream, such as its oxygen concentration or the concentration of the organic compound, which is indicative of the explosive characteristics of the reacted stream. The temperature is regulated in response to this measured property so as to insure that the reacted stream does not have an explosive composition and is normally within the range of from about 400 to about 1500° F. and preferably between about 500 and 1200° F.

Among the oxidation reactions to which the invention can be applied is any vapor phase reaction in which an organic compound containing carbon and hydrogen is partially oxidized in a tubular reactor in the presence of a solid catalyst packing which catalyzes the reaction, such solid catalyst packing generally, but not necessarily, containing a metal, metal oxide, or metal salt, where the metal is either copper or silver or is taken from groups V (V, Sb, Bi, As), VI (Cr, Mo, W, U), VII (Mn), or VIII (Fe, Co, Ni, Rh, Pd) of the Periodic Table. The principle of the invention could also apply to non-catalytic reactions where a vapor phase oxidation of an organic compound by an oxygen-containing gas is carried out in a tubular reactor having dimensions specified in the presence of an inert packing.

As illustrative examples to which the process of the present invention can be applied using tubular reactor having tubes of the specified dimensions include (A) non-catalytic reactions where a vapor phase oxidation is carried out in the presence of an inert packing, e.g., (1) oxidation of ethylene glycol to glyoxal and (2) oxidation of acetaldehyde to peracetic acid and (B) catalytic reactions carried out in the presence of a solid catalyst packing which catalyzes the reaction and includes:

(1) butane or butenes to maleic anhydride, using vanadium pentoxide as a catalyst,
(2) ethylene to ethylene oxide, using silver as a catalyst,
(3) propylene to acrylonitrile in the presence of oxygen and ammonia, using a bismuth molybdate catalyst,
(4) propylene to acrolein, using copper or copper oxide or bismuth molybdate as a catalyst,
(5) butene to butadiene in the presence of oxygen and a bismuth molybdate catalyst,
(6) butadiene to furan using a bismuth molybdate catalyst,
(7) benzene to maleic anhydride, using vanadium pentoxide as a catalyst,
(8) toluene to benzoic acid, using vanadium pentoxide as a catalyst,
(9) acrolein to acrylic acid, using bismuth molybdate as a catalyst,
(10) o-xylene or naphthalene to phthalic anhydride, using vanadium pentoxide as a catalyst,
(11) oxidation of methanol to formaldehyde in the presence of silver, copper, or oxides of molybdenum, iron, or vanadium catalyst, and
(12) ethanol to acetaldehyde in the presence of silver catalyst.

The invention will be further described with reference to the accompanying drawings forming a part of this specification and showing certain preferred embodiments by way of examples, wherein.

Figures 1, 2:
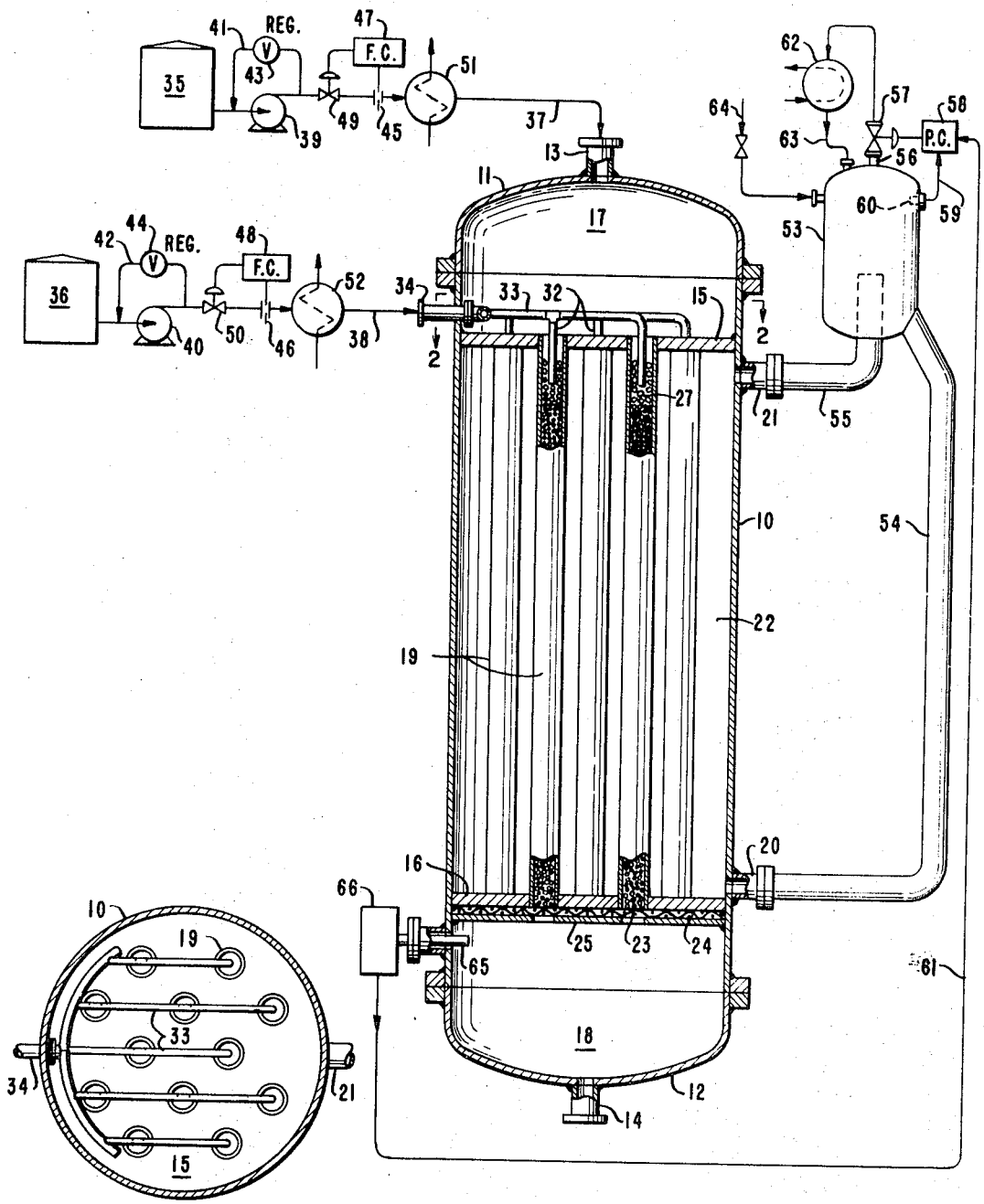
FIG. 1 is a sectional view through a multi-tube reactor and certain auxiliary equipment, parts appearing in elevation and others diagrammatically.
FIG. 2 is a plan view of the manifold, viewed as indicated by the line 2—2 of FIG. 1.
Figure 3:
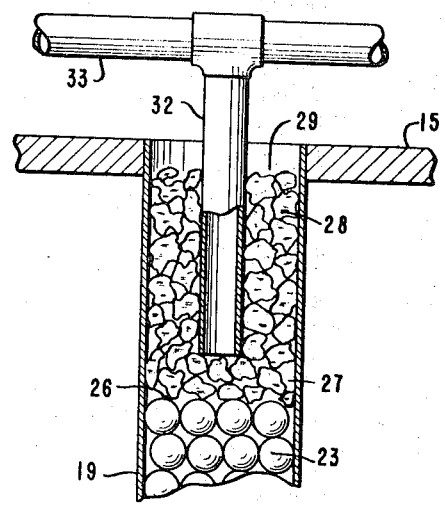
FIG. 3 is an enlarged fragmentary view of the inlet end one tube.

Referring to FIGS. 1–3 of the drawing in detail, the reactor comprises an upright enclosing vessel 10 having flanged upper and lower heads 11 and 12, the former including an inlet nozzle 13 and the latter a discharge nozzle 14. The vessel contains upper and lower tube sheets 15, 16, sealed to the vessel wall and defining an upper inlet manifold chamber 17 and a lower outlet manifold chamber chamber 18. Reactor tubes 19 are fitted in sealed relation at openings in the tube sheets and establish communication between the said manifold chambers. The vessel is provided with nozzles 20 and 21 for the circulation of a coolant through the cooling space 22 between the tube sheets, for external contact with the tubes. Each reactor tube 19 contains a stationary bed 23 of packing which may be inert or catalytic and it may be in any suitable form, such as granules, spheres, or cylinders. The length to diameter ratio of the tubes is advantageously over 200.

When catalyst beds are used as shown in 23, the beds ar supported at the bottoms of the tubes by suitable means, e.g., by a screen 24, attached to the lower tube sheet 16 by a supporting plate 25 carried by the tube sheet and/or the vessel. According to one embodiment each catalyst bed has its top surface 26 (FIG. 3) well below the top of the tube to leave a confluence zone 27. The zone 27 is in this embodiment filled with an initial packing 28 with its top surface 29 well above the lower end of a small inlet pipe 32. This initial packing may consist of inert granules. The open tops of the reactor tubes constitute inlets for substreams of the stream which is admitted via the nozzle 13. A substream at the other stream is admitted directly to the confluence zone 27 of each tube through the auxiliary inlet pipe 32, which is smaller than the tube and extends down through the said open end. The pipes 32 are connected to distributing manifolds 33 which are situated within the chamber 17 and are connected to a common supply pipe 34.

Sources for the two streams to be admitted are represented at 35 and 36. One stream is flowed through a supply conduit 37 to the nozzle 13 and the other through a supply conduit 38 to the pipe 34. When the source pressures are insufficient, compressors 39 and 40, provided with by-pass return pipes 41 and 42 and back-pressure valves 43 and 44, are included to insure the flow rates to be described. Further, the supply conduits have flowmeters 45 and 46, connected to flow controllers 47 and 48, respectively; these control the openings of low-control valves 49 and 50. Feed preheaters 51 and 52 may be additionally provided.

It is further desirable to control the rate of circulation of coolant within the space 22 and/or the temperature thereof thereby to control the reaction rate. Any suitable system may be used. In the illustrative embodiment the temperature is controlled by regulating the pressure of a boiling coolant, which flows out from the reactor vessel through the nozzle 21 and a pipe 55, typically as a mixture of liquid and vapor, to an elevated liquid-vapor separator 53. The liquid coolant is returned to the nozzle 20 through a pipe 54 by thermosyphon action. The separator 53 has a vapor outlet pipe 56 fitted with a flow-control valve 57 which is controlled from a pressure controller 58; the latter receives a pressure measurement signal via a line 59 from a pressure-sensing cell 60 in the separator. The pressure controller 58 has an additional control line 61 by which its set point is varied. The vapor from pipe 56 flows to an elevated condenser 62 and is returned to the separator 53 via a pipe 63, together with make-up coolant from a pipe 64, all shown diagrammatically.

The coolant may be a material such as a mixture of diphenyl and diphenyl oxide, known commercially as Dowtherm, which has a boiling point at the desired reaction temperature at convenient pressures.

An instrument 65 for measuring the explosiveness of the reacted mixture is provided according to an optional feature. This may, for example, be an analyzer to determine the composition of the reacted mixture in the exit manifold chamber 18, such as an oxygen-analyzer or an analyzer for the organic compound. This includes a cell 65 which samples the reacted mixture and a controller 66 which emits a control signal to the line 61 in response to the concentration of oxygen or organic compound measured by the cell 65.

The flow controllers, pressure controller and analyzers are known per se are, for this reason, not further described.

Although either source 35 or 36 may be the source of the organic compound-containing stream and the other the source of the oxygen-containing stream, the operation will be described for the case in which the source 35 supplies organic compounds; the source 36 then supplies oxygen-enriched air or pure oxygen.

The two streams are supplied at rates determined by the flow controllers 47 and 48 in ratio to form a mixture of substantially explosive composition. The organic compound-containing stream flows through the manifold chamber 17 and substreams thereof enter the open upper ends of the several reactor tubes, flowing through the initial packings 28 and into the confluence zones 27. In the embodiment shown in FIG. 3, the top surfaces 29 of the initial packings are preferably, but not necessarily, above the lower ends of pipes 32. The oxygen-containing gas flows through the manifolds 33 and substreams thereof enter the said confluences zones 27 directly through the pipes 32 to form mixtures of substantially explosive composition. The flow rates are regulated to cause the resulting mixtures to flow downwards through the confluence zones 27 and then down through the top surfaces 26 of catalytic beds 23 at a velocity in excess of that at which a flame can flash back to the zone 27. Mixing of the streams continues within the upper parts of the catalyst beds 23. The oxygen and the organic compounds react catalytically in these beds and the free-oxygen contents and free-organic compound contents of the mixtures are thereby progressively reduced so that, upon emerging from the lower ends of the tubes into the manifold chamber 18 the mixtures are not explosive. The reaction rates are controlled by the temperature, which is dependent upon the coolant in the space 22.

The temperature control is, in the illustrative embodiment, exercised by the pressure controller 58 which, by controlling the valve 57, regulates the pressure within the separator 53 and, hence, within the cooling space 22. This, in turn, determines the temperature at which the coolant boils in external contact with the tubes. For any given set point determined by the signal in the line 61, the pressure controller maintains a constant pressure in response to pressure changes sensed by the cell 60. The free-oxygen content or content of organic compound reactant, of the reacted mixture is monitored by the cell 65; should it rise, indicating an approach to explosive composition in the reacted exit stream, the controller 66 acts through line 61 to raise the set point of the pressure controller, thereby boiling less coolant and increasing the reaction rate; conversely, a fall in free oxygen content or content of organic compound reactant, results in a lowering of the pressure to increase the reaction rate.

Figure 4:
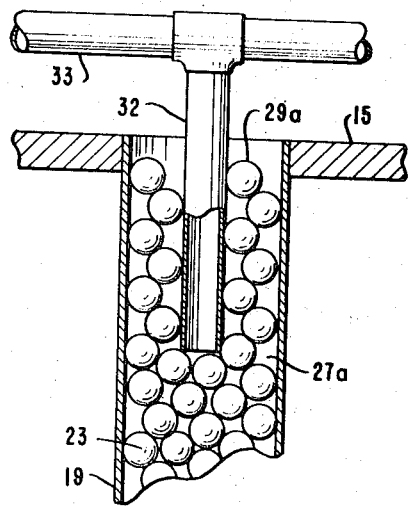

In the embodiment shown in FIG. 4, wherein like reference numbers denote like parts, catalytic packnig is used as the inital packing, and the top surfaces 29a of the catalytic packings 23 are above the lower end of pipes 32; hence, the confluence zone 27a is filled with catalyst. The length-to-diameter ratio of the reactor tubes 19 is again preferably over 200.

Figure 5:
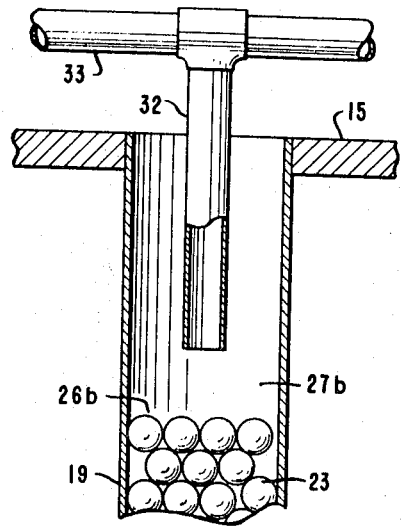
FIGS. 4 and 5 are views corresponding to FIG. 3 showing modified dispositions of the packing.

In the embodiment shown in FIG. 5, the initial packing is omitted and the confluence of the organic compound-containing stream and oxygen-containing stream occurs in the otherwise empty zone 27b, above the top surfaces 26b of the catalytic packing 23, in the absence of any packing.

Figure 6:
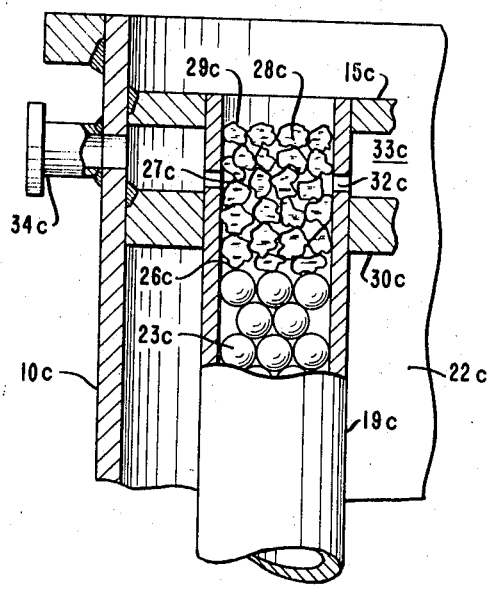
FIG. 6 is a fragmentary sectional view of the upper part of a reactor vessel showing a modified arrangement of the auxiliary inlets to the reactor tubes; and, FIG. 7 is a sectional view showing two multitubular reactors connected in series for carrying out successive reactions.

In the modified arrangement of FIG. 6 of the vessel 10c has two upper tube sheets 15c and 30c instead of the single tube sheet 15. The sheet 30c is the principal sheet which bounds the cooling space 22c. The reaction tubes 19c, of which only one is shown, are inserted into the tube sheets 15c, 30c and a lower tube sheet (not shown, but corresponding to the tube sheet 16 of FIG. 1) and rolled into the tube sheets to form tight seals. The upper end of each tube has small apertures 32c spaced well below the upper tube end and in communication with a manifold chamber 33c situated between the tube sheets 15c and 30c. A nozzle 34c is in communication with this manifold chamber 33c for the introduction of either the oxygen-containing or the organic-containing stream; the other stream is supplied to the top of the reactor vessel through the top (through a nozzle such as the nozzle 13 of FIG. 1) and enters the open upper ends of the reactor tubes. Each tube 19c contains a bed 23c of catalyst with a top surface 26c situated below the apertures 32c and a bed of inert initial packing 27c with a top surface 29c preferably but not necessarily above the apertures. The two streams first commingle within a confluence zone 27c opposite the apertures 32c.

It is evident that in FIG. 6 the manifold 33 of FIG. 1 is replaced by chamber 33c and the pipes 32 by the apertures 32c. The other parts are as previously described, and operation is similar. In this embodiment the optional variants shown in FIGS. 4 and 5 with respect to the packing of the mixing zone are also available.

Figure 7:
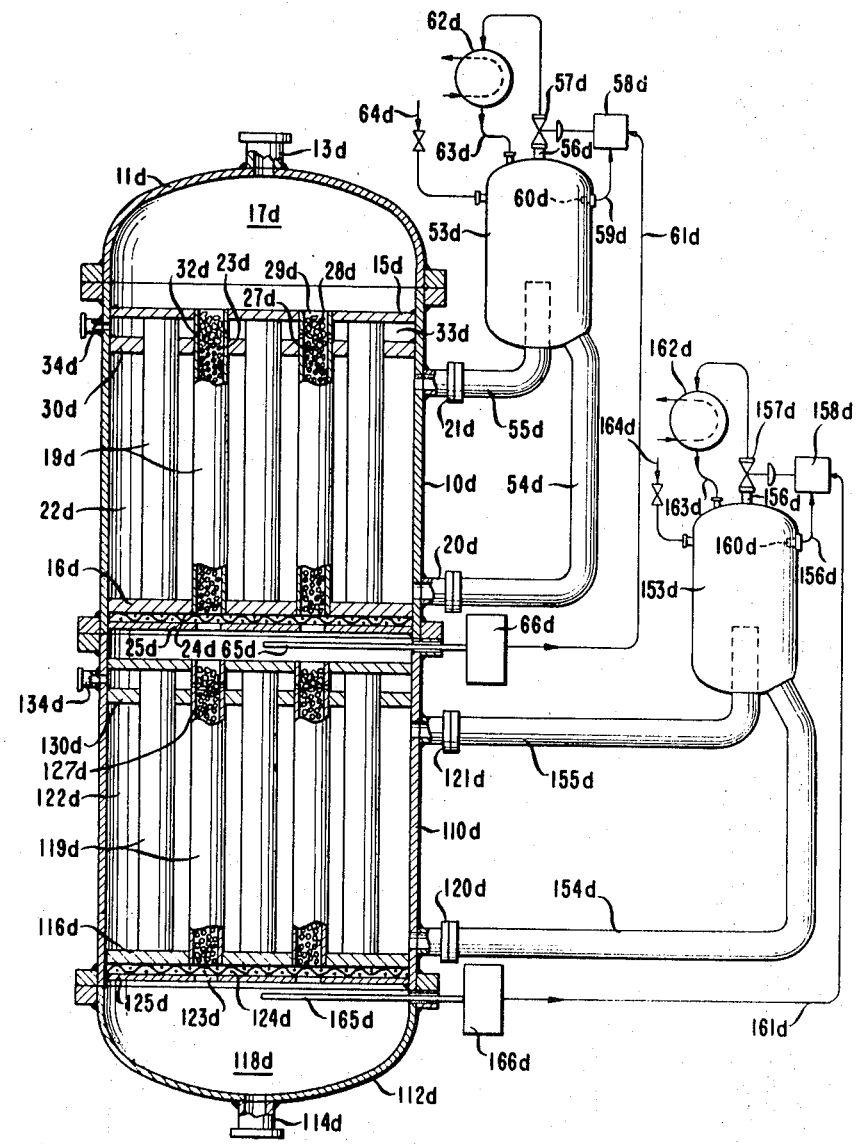

Referring to FIG. 7, there is shown a dual reactor suitable for the step-wise addition of one of the streams. The upper vessel 10d, and parts 11d, 13d, 15d, 16d, 17d, 20d–25d and 53–66d corresponds to parts identified in FIG. 1 by corresponding numbers with suffixes; and parts identified in FIG. 6 by numbers bearing the suffix "c" are included, some identified by corresponding numbers with the suffix "d." The upper vessel is connected by bolting flanges to a lower vessel 110d which is constructed like the upper vessel save that it lacks an upper head but has a lower head 112d with a nozzle 114d. Other parts identified by numbers increased by "100" are like the parts of the upper vessel. The reactor tubes 119d are advantageously in alignment with and spaced only by a small distance from the tubes 19d, whereby there is rapid flow of gas from the latter into the former and only limited cross-mixing occurs.

It is evident that the upper and lower vessels provide reactors that can be independently regulated as regards temperature in the manner described above. In operation, the upper section is operated as was previously described, by admitting either the organic compound-containing stream or the oxygen-containing stream to the nozzle 34d and the other stream to the nozzle 13d, and the mixture of substantially explosive composition formed in the confluence zones within the tubes 19d are reacted by flowing down through the catalyst beds 23d at a velocity in excess of the flash-back velocity. The partly reacted streams emerging from the lower ends of the upper tubes 19d enter the open upper ends of the lower tubes 119d and are mixed with additional reactant admitted via nozzle 134d. The latter may be supplemental oxygen-containing gas; but it is also possible, when working with oxygen-rich systems, wherein the partly reacted streams become non-explosive by the necessary consumption of the organic compound, to supply supplemental organic compound-containing gas. In either event, there is formed within each of the confluence zones 127d in the upper ends of the lower reaction tubes a mixture of substantially explosive composition, which flows downwards through the catalyst bed 123d at a velocity in excess of the flash-back velocity. The catalyst in bed 123d may be the same as but is usually different from that used for the bed 23d. The finally reacted mixture is discharged through the nozzle 114d.

By way of a specific example, the bed 23d may consist of copper oxide catalyst and the bed 123d of catalyst consisting principally of molybdenum phosphate. Propylene can be oxidized in the upper tubes to produce a partially reacted stream which contains acrolein; this stream is mixed with additional oxygen admitted at 134d and further oxidized in the lower tubes to produce a stream containing acrylic acid.

The important features in all of these embodiments are that the flow rates of the organic compound and oxygen-containing streams are controlled in a ratio to give a mixture of substantially explosive composition, that the mixing of the oxygen-containing and hydrocarbon-containing streams occurs in long reactor tubes at velocities above the flame propagation velocity, that the velocity is maintained above the flash-back or flame propagation velocity prior to entering or in the initial part of the catalyst bed, and that the temperature of the catalyst is controlled to produce at the downstream end of the catalyst packing a reacted mixture which is not explosive. An additional preferred feature of the invention is that the confluence of the organic compound-containing streams and oxygen-containing streams takes place in the presence of an initial packing which may be either catalytic or inert and is contained in the reactor tubes.

EXAMPLE

This example illustrates some of the difficulties and limitations encountered with conventional tubular oxidation reactors. This sample will be followed with another example showing how these limitations can be overcome with the invention.

The vapor-phase oxidation of o-xylene with air in a multitubular reactor is an example of commercial operation in which the concentration of one of the reactants is severely limited, both because of the possibility of explosion and the difficulty in controlling the highly exothermic reaction. The reaction is carried out commercially with a vanadium oxide catalyst supported on an inert support. The catalyst is contained in small-diameter tubes with an inside diameter of about one inch or less, the ends of which are expanded or rolled into a top and a bottom tube sheet, respectively. The entire assembly of tubes and tube sheets are fitted into an upright vessel having upper and lower heads. The space between the upper head and top tube sheet serves as a manifold chamber for feeding the pre-mixed reactant gases, and the space between the bottom tube sheet and lower head serves as a manifold chamber for removing the product gas. The outside surfaces of the tubes are cooled by circulation of a melted cooling salt which is maintained at a temperature of about 900° F. Ortho-xylene feed is vaporized and mixed with air to give a mixed gas outside of the explosive region. The mixed gas is then compressed and fed to the reactor described above. Further details of the manufacture of phthalic anhydride from o-xylene are given in an article published in Chemical Engineering Progress (vol. 43, p. 168, 1947), and in U.S. Pat. 2,474,001, dated June 21, 1949. In discussing the oxidation of o-xylene to phthalic anhydride, and also the oxidation of naphthalene to phthalic anhydride, the first reference states that both reactions are highly exothermic and must be closely controlled; and that this is accomplished primarily by using small diameter catalyst tubes and circulating a cooling salt at a high rate. Thermocouple points are burned at various depths in selected catalyst tubes in order to have a cross-sectional view of temperature conditions in the catalyst at all times. Numerous recording and automatic alarms and shut-off devices are employed to guard against excessive temperatures at any point. In discussing the possibility of explosion, this reference further states that since both the hydrocarbon feed and the product are combustible, care is taken to minimize the likelihood of ignition and explosion. The ratio of air to hydrocarbon is maintained outside of the inflammability limits and an efficient fire extinguisher system is installed in the condensers.

The second reference gives further details of the oxidation of o-xylene to phthalic anhydride, In Example 1 of this reference, the inside diameter of the catalyst tubes is ⅝ inch, and the length of the tubes is 30 inches. (The length to diameter ratio is thus 48.) The mole ratio of air to hydrocarbon is 133 to 1. (The lower explosive limit for o-xylene in air is 1 mole percent. The composition given is, therefore, outside of the explosive range.) The coolant temperature is maintained at 900° F. and the temperature of the hot zone of the catalyst bed is 1100° to 1150° F. The yield of phthalic anhydride from o-xylene is about 80%. The calculated concentration of phthalic anhydride in the product gas from the reactor is approximately 0.6% by volume. Thus, approximately 167 volumes of gas must be compressed and circulated through the reactor and product recovery system for each volume of phthalic anhydride recovered.

It has been found by experience that when attempts are made to increase the concentration of hydrocarbon reactants in such systems as described above, not only are explosive hazards encountered, but the reaction becomes extremely difficult and eventually impractical to control as the hydrocarbon concentration is raised.

The limitation in reactant concentrations encountered in commercial operation as described above can be overcome with this invention. As an example, the oxidation of o-xylene to phthalic anhydride will be described as carried out with the employment of the invention illustrated in FIGS. 1, 2 and 3. The tubes 19 are ¾ inch inside diameter and 60 feet long. The length to diameter ratio is thus 800 as contrasted to 48 for the previous example. The catalyst particle size is approximately ³⁄₁₆ to ¼ inch in diameter. The o-xylene and air are not premixed as in the previous example, but are mixed only at high velocities within the confluence zones 27 in the reactor tubes. The coolant is a melted salt and the catalyst is vanadium oxide supported on an inert support. The air is compressed and fed through line 37 into manifold chamber 17 and into the multiple reactor tubes 19 through inert packing 28 into confluence zones 27. The o-xylene is vaporized and pre-heated and fed through the line 38 into manifold 33 and then directly into the confluence zones 27 contained in multiple tubes 19. The o-xylene and air are passed down through the inert packing in the zones 27 at a mass velocity of 1.5 pounds of total gas per second per square foot of cross-sectional area. This velocity is in excess of the flame propagation velocity for the conditions described. After mixing, the mixed feed gas contains 5% by volume of o-xylene, 20% by volume of oxygen, and 75% by volume of nitrogen and other inert gases. A sample of gas of this composition, when tested in a bomb equipped with a hot-wire igniter was found to be explosive. After mixing the mixed gas then passes down into the catalyst bed at the said mass velocity. The temperature of the melted salt coolant is controlled to give an oxygen conversion of 70%. Depending upon the activity of the catalyst, this temperature will be in the range of 800 to 900° F. The gas leaving the reactor contains approximately 6.0% by volume of oxygen and the gas is non-explosive. The product gas contains 2.7% by volume of phthalic anhydride as contrasted to only 0.6% by volume in the previous example of conventional operation. Thus, it is now necessary to process only 37 volumes of gas to recover 1 volume of phthalic anhydride vapor, as contrasted to 167 volumes of gas per volume of phthalic anhydride vapor described in the previous example of conventional operation. As a result, the size of all items of equipment in the plant are greatly reduced in size, including the reactor, compressors, piping, utilities, and product recovery equipment. Furthermore, in spite of the much higher concentration of o-xylene reactant, there is no hazard from explosion and the reaction is readily controllable.

I claim as my invention:

1. A reactor for effecting partial oxidation of organic compounds in the vapor phase in admixture with an oxygen-containing gas at high concentrations of both oxygen and the said compound which comprises:
   (a) a long reactor having long multi-tubes having a ratio of length to diameter of at least 200, an inlet for a first stream at the upstream end thereof and an outlet at the downstream end thereof and containing packing at least within the downstream part thereof;
   (b) auxiliary inlet means for admitting a second stream in isolation from said first stream to a confluence zone situated within said tubes near to but spaced downstream from said inlet for forming within said zone a mixture of substantially explosive composition and flow of said mixture downstream from said zone through said packing;
   (c) wherein said tubes are open at the upstream ends to provide said inlet, and the auxiliary inlet means includes a pipe smaller than said tubes and extending into the tubes to said confluence zone;
   (d) means for controlling the temperature of the resulting mixture flowing in the tubes through said packing to control the reaction rate;
   (e) means for determining a property of the reacted stream after passage through said packing, said property being one indicative of its explosive characteristics;
   (f) means for circulating a coolant in external contact with said tubes; and,
   (g) means responsive to said measured property for regulating the temperature of said coolant.

References Cited

UNITED STATES PATENTS

| | | | |
|---|---|---|---|
| 2,242,390 | 5/1941 | Carpenter. | |
| 2,408,282 | 9/1946 | Wolf | 23—277 |
| 2,532,756 | 12/1950 | Brunjes et al. | 23—288 |
| 2,645,566 | 7/1953 | Stookey | 23—288 X |
| 2,801,159 | 7/1957 | Carton et al. | 23—288 X |
| 2,817,690 | 12/1957 | Lobo | 23—277 X |
| 3,195,989 | 7/1965 | Pyzel | 23—288 |
| 3,215,508 | 11/1965 | Piester | 23—288 |
| 3,071,454 | 1/1963 | Kuzell et al. | 23—288 X |

JOSEPH SCOVRONEK, Primary Examiner

U.S. Cl. X.R.

23—253, 277, 284